C. B. TRUE.
Sewing-Machine.

No. 215,080. Patented May 6, 1879.

Witnesses
Philip F. Larner
Howell Bartle

Inventor
Cyrus B. True
By M. C. Wood
Attorney

UNITED STATES PATENT OFFICE.

CYRUS B. TRUE, OF PROVIDENCE, RHODE ISLAND.

IMPROVEMENT IN SEWING-MACHINES.

Specification forming part of Letters Patent No. 215,080, dated May 6, 1879; application filed March 13, 1879.

*To all whom it may concern:*

Be it known that I, CYRUS B. TRUE, of the city, and county of Providence, in the State of Rhode Island, have invented certain new and useful Improvements in Sewing-Machines; and I do hereby declare that the following specification, taken in connection with the drawings furnished and forming a part thereof, is a clear, true, and complete description of my invention.

Sewing-machines have heretofore been provided with bobbin-winders capable of being operated while the needle-bar and feeding mechanism are at rest.

My improvements relate to particular means whereby the band-pulley and the balance-wheel (if one be used in connection with the band-pulley) may be readily disconnected rotatively from the driving-shaft for driving the bobbin-winder; and my invention consists in the combination, with a driving-shaft provided with a conical collar at its outer end and a band-wheel loosely mounted on said shaft and provided with a threaded hub, of a nut provided with a tapered recess and a screw-thread, for engaging, respectively, with the conical collar and the threaded hub.

The nut, being at the end of the shaft, is always accessible, and a slight turn thereof is sufficient to connect or disconnect the band-pulley and driving-shaft, and the device is simple, inexpensive, and effective under all circumstances incident to its use.

To more particularly describe my invention, I will refer to the accompanying drawings, in which—

Figure 1:
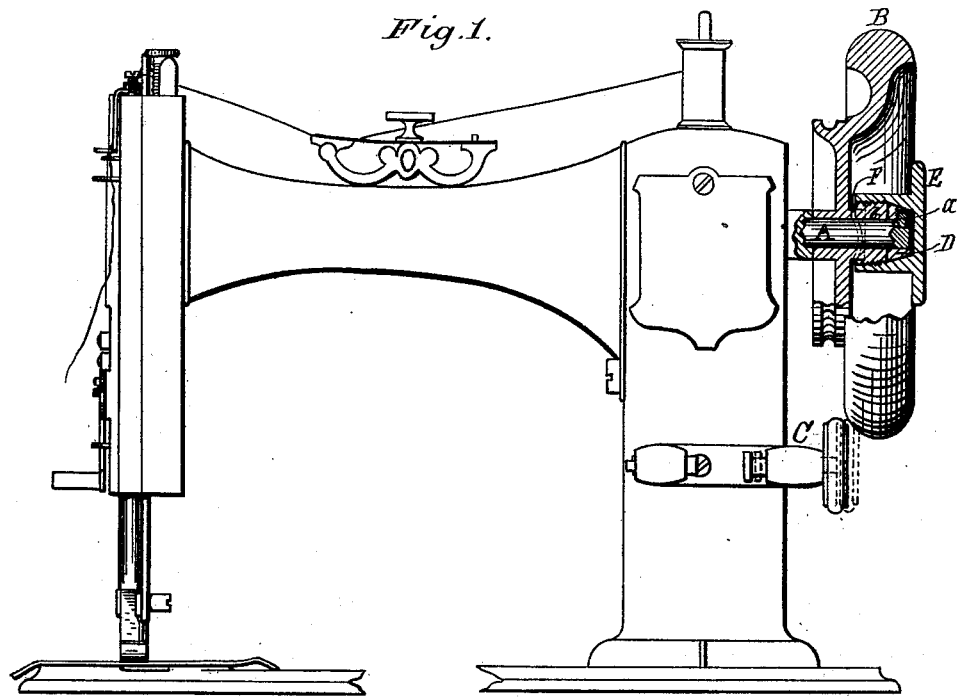
Figure 2:
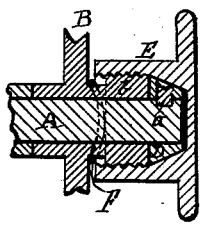

Figure 1 represents, in side view, a sewing-machine with my improvements attached, and shown in section. Fig. 2 represents, in section, on an enlarged scale, the shaft, band-pulley, and nut.

The driving-shaft A is, in this instance, located in the bracket-arm of the machine, and is driven from the usual large band-pulley below the table.

The band-pulley B is, in this instance, of that class which performs also the function of a balance-wheel, and its periphery, by frictional contact, is, in this instance, relied upon for communicating motion to the spooler or bobbin-winder C, which has a friction-pulley arranged, as usual, to be moved toward and away from the balance-wheel.

The band-pulley is mounted loosely upon the driving-shaft, and is retained thereon by means of the conical collar D, which is secured by a set-screw, $a$, and presents a shoulder to the end of the hub $b$ on the band-wheel. The hub of the band-wheel is threaded externally.

The nut E is the device by which the shaft and band-pulley are operatively connected for driving the sewing mechanism.

The nut has a knurled periphery, and is provided with a sleeve having an interior thread, which engages with the threaded hub $b$ of the band-wheel, and a circular recess with inclined sides, which frictionally engage with the conical collar D on the driving-shaft. When the nut is turned upon its thread, frictional contact is secured between the nut and collar by way of the thread, the several parts being firmly bound together.

When the nut is loosely set on the hub, the band-wheel is freely revolved for driving the bobbin-winder without operating other portions of the machine.

The nut E is held in place and prevented from running off by the force of a spring, F, bearing against said nut and the web of the wheel B.

Having thus described my invention, I claim as new and desire to secure by Letters Patent—

The combination, with the driving-shaft provided with a conical collar and the band-pulley loosely mounted on said shaft, provided with a threaded hub, of a nut provided with a tapered recess, and a thread for respectively engaging with the conical collar on the shaft and the threaded hub, substantially as described.

CYRUS B. TRUE.

Witnesses:
JOHN D. THURSTON,
WILMARTH H. THURSTON.